United States Patent
Schmidt

(10) Patent No.: US 8,962,206 B2
(45) Date of Patent: Feb. 24, 2015

(54) METHODS OF OPERATING FUEL CELL STACKS AND SYSTEMS RELATED THERETO

(75) Inventor: Rainer W. Schmidt, Burnaby (CA)

(73) Assignee: Daimler AG, Stuttgart (DE)

( * ) Notice: Subject to any disclaimer, the term of this patent is extended or adjusted under 35 U.S.C. 154(b) by 1769 days.

(21) Appl. No.: 12/277,094

(22) Filed: Nov. 24, 2008

(65) Prior Publication Data

US 2010/0129688 A1    May 27, 2010

(51) Int. Cl.
H01M 8/02    (2006.01)
H01M 8/04    (2006.01)

(52) U.S. Cl.
CPC ...... *H01M 8/04805* (2013.01); *H01M 8/04402* (2013.01); *H01M 2250/20* (2013.01); *Y02E 60/50* (2013.01); *Y02T 90/32* (2013.01)
USPC .......................................... 429/443

(58) Field of Classification Search
USPC ................. 429/443, 428, 429, 444, 446, 449
See application file for complete search history.

(56) References Cited

U.S. PATENT DOCUMENTS

| | | | |
|---|---|---|---|
| 7,234,450 B1 | 6/2007 | Takakura et al. | 123/494 |
| 2002/0110713 A1 | 8/2002 | Reindl et al. | 429/22 |
| 2007/0218330 A1 | 9/2007 | Naganuma | 429/25 |
| 2008/0014472 A1 * | 1/2008 | Logan | 429/13 |
| 2010/0112410 A1 * | 5/2010 | Clingerman et al. | 429/34 |
| 2010/0151360 A1 * | 6/2010 | Yoshizumi et al. | 429/514 |
| 2010/0273070 A1 * | 10/2010 | Harris et al. | 429/429 |

FOREIGN PATENT DOCUMENTS

| | | |
|---|---|---|
| JP | 2006-079891 | 3/2006 |
| WO | WO 2008/018243 A1 | 2/2008 |

* cited by examiner

*Primary Examiner* — Mark F Huff
*Assistant Examiner* — Monique Wills
(74) *Attorney, Agent, or Firm* — Crowell & Moring LLP

(57) ABSTRACT

Methods and systems for operating a fuel cell stack having a fuel exhaust stream and a vessel downstream of the fuel cell stack fluidly connected to the fuel exhaust stream are provided. In one embodiment, the method comprises displacing substantially all residual gas in the vessel by providing at least a portion of the fuel exhaust stream to the vessel, and isolating the vessel from the fuel cell stack after the fuel exhaust stream displaces substantially all residual gas in the vessel. At least one bleed down characteristic is determined as fuel exhaust within the vessel is released through an orifice, and an operating condition of the fuel cell stack is set or determined based on the at least one bleed down characteristic. In a specific embodiment, the hydrogen concentration in the fuel exhaust is determined based on the at least one bleed down characteristic.

16 Claims, 3 Drawing Sheets

METHODS OF OPERATING FUEL CELL STACKS AND SYSTEMS RELATED THERETO

BACKGROUND

1. Technical Field

The present invention relates to methods of operating fuel cell stacks, as well as corresponding systems.

2. Description of the Related Art

Electrochemical fuel cells convert reactants to generate electric power and reaction products. Electrochemical fuel cells generally employ an electrolyte, such as an ion-exchange membrane, interposed between two electrodes, namely an anode and a cathode, to form an electrode assembly. The electrode assembly is typically interposed between two electrically conductive flow field plates or separators that act as current collectors, provide support for the electrodes, and provide passages for the reactants and products. Such separators typically contain flow fields to supply reactants, such as fuel and oxidant, to the anode and the cathode, respectively, and to remove excess reactants and reaction products, such as water formed during fuel cell operation. Typically, a number of fuel cells are connected in series to form a fuel cell stack.

Fuel cell stacks may be operated in many different ways, including dead-ending the anode and recirculating the fuel. In such modes of operation, nitrogen from the air in the cathode typically crosses over through the ion-exchange membrane to the anode due to a concentration gradient. As fuel is consumed in the fuel cell, the concentration of nitrogen in the anode increases. This accumulating of nitrogen negatively impacts the performance of the fuel cell stack. In addition to nitrogen, minute amounts of impurities from the fuel source can also build up in the anode as fuel is consumed and negatively impact operation of the fuel cell.

To remove excess nitrogen and other impurities from the anode, fuel cell systems often contain a purge assembly, such as a purge valve, downstream of the fuel cell stack to periodically purge the fuel exhaust. A purge valve is typically a solenoid purge valve, such as a two-way (open-close) solenoid valve, or a pulse-width modulated (PWM) valve. However, if the purging conditions are not properly defined, an undesired amount of hydrogen may be purged in the fuel exhaust, thereby decreasing fuel efficiency and possibly creating a flammable environment.

To avoid these problems, gas sensors have been used extensively in fuel cell systems for determining the hydrogen concentration of the fuel exhaust to ensure that a minimal amount of hydrogen is purged from the fuel cell stack. For example, U.S. Patent Application Publication No. US2002/0110713 discloses a gas sensor in the interior fluid passages of a fuel cell assembly, or within fluid passages employed to transport reactant fluid streams to and/or from the fuel cell(s).

Hydrogen sensors are typically expensive and may be unreliable. For example, PCT Publication No. WO2008/018243 discloses a hydrogen gas concentration sensor which comprises a base and hydrogen-detecting films. These hydrogen-detecting films have a thin film layer and a catalyst layer which, upon contact with hydrogen gas, hydrogenates the thin film layer to reversibly change its electrical resistance. These thin film layers have a higher sensitivity when the hydrogen gas concentration is low, and a wider determination range when the hydrogen gas concentration is high. Such hydrogen gas concentration sensors, however, are complicated and expensive to make, and are subject to degradation over the lifetime of the fuel cell stack.

Other techniques to measure the concentration of hydrogen involve measuring the pressures upstream and downstream of the fuel cell stack, and using the pressure difference to determine the hydrogen concentration. However, water droplets in the flow field channels of the fuel cell often produce inaccurate downstream pressure measurements, and thus an inaccurate estimate of the hydrogen concentration.

As a result, there remains a need for improved methods of determining the hydrogen concentration, particularly in the fuel exhaust stream of a fuel cell stack. The present invention addresses this need and provides other related advantages.

BRIEF SUMMARY

In one embodiment, a method of operating a fuel cell system is provided, wherein the fuel cell system comprises a fuel cell having a fuel exhaust stream and a vessel downstream of the fuel cell stack fluidly connected thereto. The method comprises the steps of displacing substantially all residual gas in the vessel by providing at least a portion of the fuel exhaust stream to the vessel; isolating the vessel from the fuel cell stack after the fuel exhaust stream displaces substantially all residual gas in the vessel; determining at least one bleed down characteristic as fuel exhaust within the vessel is released through an orifice; and setting an operating condition of the fuel cell stack based on the at least one bleed down characteristic.

In another embodiment, a method of determining a hydrogen concentration in a fuel exhaust of a fuel cell stack is provided. The method comprises the steps of providing at least a portion of the fuel exhaust from the fuel cell stack to a vessel downstream and fluidly connected to the fuel cell stack, the vessel comprising a pressure measurement means and an orifice; measuring a fuel exhaust pressure in the vessel by the pressure measurement means; isolating the vessel from the fuel cell stack; determining at least one bleed down characteristic of the fuel exhaust within the vessel is released from the vessel through the orifice; and determining a hydrogen concentration in the fuel exhaust based on the at least one bleed down characteristic.

In more specific embodiments, the orifice of the vessel is fluidly connected to ambient (atmospheric pressure), and the at least one bleed down characteristic is a bleed down time and/or a bleed down curve of the fuel exhaust within the vessel. This may further comprise a pressure measurement means, and the bleed down time may be a time for the pressure in the vessel to drop from a predetermined upper bound pressure to a predetermined lower bound pressure. Suitable operating conditions of the fuel cell stack include, but are not limited to, a fuel exhaust purge volume, a fuel exhaust purge mass flow rate, a fuel exhaust purge frequency, and a purge valve opening size. Further suitable operating conditions of the fuel cell stack include, but are not limited to, a fuel exhaust recirculation volume, a recirculation flow rate, a recirculation pump speed, a fuel stoichiometry, and an oxidant stoichiometry. The methods may further comprise additional steps, such as providing a fuel and an oxidant to the fuel cell stack and/or drawing a load from the fuel cell stack.

These and other aspects of the invention will be evident upon reference to the following detailed description and attached drawings.

DETAILED DESCRIPTION

In the following description, certain specific details are set forth in order to provide a thorough understanding of the various embodiments. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to". Also, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, there remains a need in the art for improved methods of determining the hydrogen concentration, particularly in the fuel exhaust stream of a fuel cell stack, as well as to methods and systems related thereto. Accordingly, and in one embodiment, a method is disclosed for operating a fuel cell stack. In general terms, fuel cell stacks and systems may be used for a variety of applications, including (but not limited to) automotive applications, stationary power applications, portable power applications, backup power applications, and materials handing applications. However, one of ordinary skill in this field will appreciate that this method may also be used in other applications that require the measurement of a gas concentration in a substantially dual gas mixture, wherein one of the gases is substantially denser than the remaining gas, even for applications not related to fuel cells.

Figure 1:
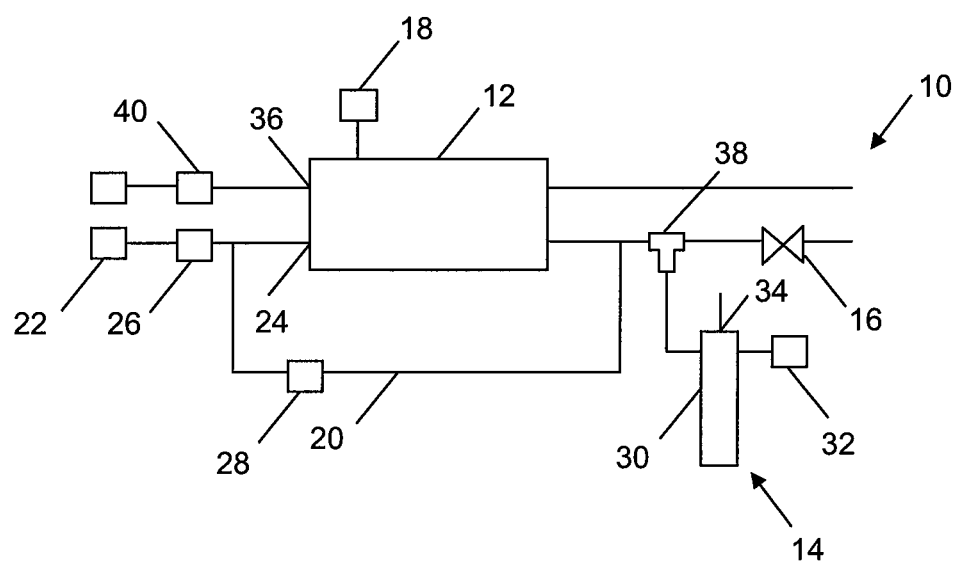
FIG. 1 shows a representative fuel cell system according to one embodiment.

For purpose of illustration, FIG. 1 shows an exemplary fuel cell system 10 that operates with fuel recirculation. Fuel cell system 10 includes a fuel cell stack 12, a hydrogen sampling device 14 downstream of the fuel cell stack for detecting the hydrogen concentration of the fuel exhaust, a purge valve 16 downstream of the fuel cell stack, and a controller 18 for controlling the various components of fuel cell system 10 (although controller 18 is shown to be connected only to fuel cell stack 12, it will be understood that it is also connected to other fuel cell system components).

Referring to FIG. 1, fuel cell system 10 also includes a recirculation loop 20 for recirculating at least a portion of the fuel exhaust that mixes with fresh fuel from pressurized fuel source 22 and supplied to fuel inlet 24 via fuel pressure regulator 26. In this case, nitrogen that crosses over from the cathode to the anode during operation will accumulate in the recirculation loop, thereby decreasing the fuel concentration and negatively impacting the performance of the fuel cell stack over time. The hydrogen concentration in the recirculation loop may range from about 50% to about 95% during operation, and typically from about 70% to about 90%, with the balance being substantially nitrogen gas. Fuel cell system 10 also contains a recirculation device 28 to assist in recirculating at least a portion of the anode exhaust. Such recirculation devices may be, for example, a blower, a compressor, a jet pump, or the like.

To determine the hydrogen concentration of the fuel exhaust in FIG. 1, hydrogen sampling device 14 includes a vessel 30 having a predetermined volume, and a pressure measurement means 32 to measure the pressure therein. Vessel 30 is fluidly connected to ambient (or atmospheric pressure) via orifice 34, which is appropriately sized so that it restricts gases in vessel 30 from venting too quickly. When a measurement of the hydrogen concentration in the fuel exhaust is desired, three-way valve 38 directs at least a portion of the fuel exhaust into vessel 30, and pressure measurement means 32 may optionally measure the pressure of the residual gas in vessel 30 prior to pressurization. Since the fuel exhaust is at an elevated pressure in comparison to vessel 30 and orifice 34 restricts the release of fuel exhaust from vessel 30, vessel 30 will become pressurized as a result of the fuel exhaust being directed into the same.

Once the fuel exhaust has displaced substantially all of the residual gas in vessel 30, for example, about 95% to about 99% of the residual gas, three-way valve 38 isolates vessel 30 from fuel cell stack 12. The pressure in vessel 30 will then drop as the fuel exhaust in vessel 30 bleeds out through orifice 34. Controller 18 then determines a bleed down characteristic by measuring the vessel pressure and time as the fuel exhaust is released through the orifice, and compares it to that stored in controller 18 to determine the hydrogen concentration in the fuel exhaust. At the end of the measurement, residual fuel exhaust will remain in vessel 30 as residual gas (likely mixed with at least a portion of air due to open orifice 34), which will be substantially displaced by fresh fuel exhaust when another hydrogen concentration measurement is desired.

It has been found that, for a given orifice size and vessel volume, the bleed down time varied largely for different concentration ratios of hydrogen to nitrogen in the fuel exhaust due to the large density difference between hydrogen and nitrogen. For example, using calculations for gaseous discharge of a vessel under unchoked adiabatic conditions, it was been found that for 1 liter vessel having a 0.4 mm orifice, the bleed down time for pure hydrogen was about 4 seconds for an upper bound pressure of about 8 psig (0.55 barg) and a lower bound pressure of about 0 psig (0 barg), while the bleed down time for pure nitrogen is about 14 seconds for the same upper and lower bound pressure. In another example, for a 1 liter vessel having a 0.8 mm orifice, the bleed down time for pure hydrogen is about 0.9 seconds, while the bleed down time for pure nitrogen is about 3.3 seconds for the same upper and lower bound pressure.

Such a measurement technique can be readily integrated into a fuel cell system due to its simplicity, and is relatively inexpensive in comparison to conventional gas sensors. For example, the bleed down times between a suitable predetermined upper and lower bound pressure for different hydrogen/nitrogen concentration ratios can be predetermined empirically and stored in the controller in the form of a mathematical function or lookup table. The hydrogen concentration can then be determined by comparing the measured bleed down time to that stored in the controller.

Figure 2:
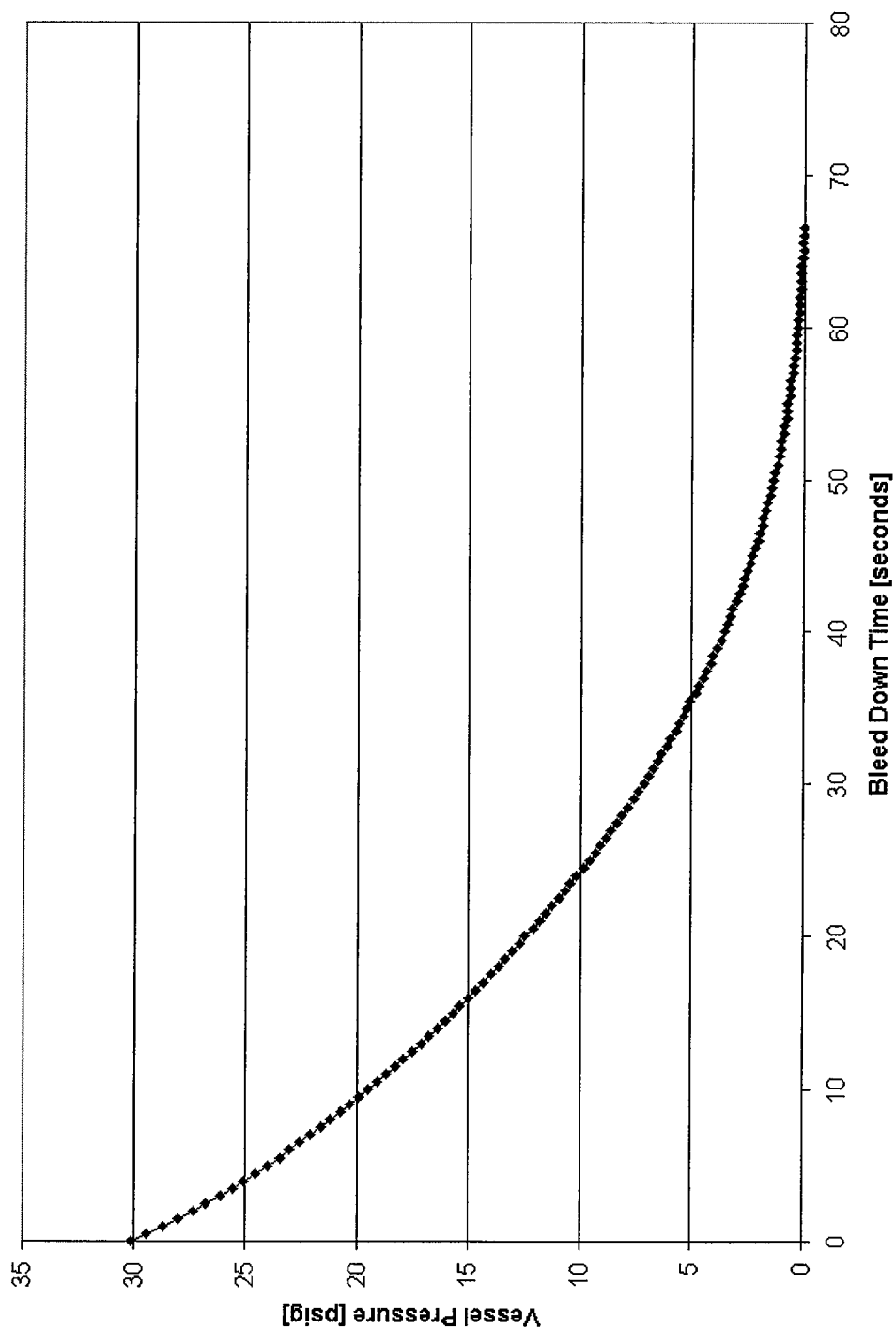
FIG. 2 shows a bleed down curve of the fuel exhaust pressure versus the bleed down time for pure nitrogen in a 2 liter vessel having a 0.6 mm diameter orifice.

Additionally, or alternatively, bleed down curves of the fuel exhaust pressure in the vessel over time can be generated empirically for fuel exhaust gases having different hydrogen/ nitrogen concentration ratios, using the same size vessel and orifice size, and then stored in the controller in the form of a mathematical function or lookup table. FIG. 2 shows such an empirically-generated bleed down curve of the fuel exhaust pressure versus bleed down time for pure nitrogen in a 2 liter vessel having a 0.6 mm diameter orifice. Such curves will be different for different hydrogen/nitrogen concentration ratios due to the density difference of the two gases. For example, the bleed down curve for pure hydrogen will be much steeper than that for pure nitrogen. Again, the hydrogen concentration can be determined by comparing the measured bleed down curve to that stored in the controller.

The estimated hydrogen concentration of the fuel exhaust can be used in a number of ways, such as setting or determining the appropriate operating conditions of the fuel cell stack. For example, controller 18 may use the estimated hydrogen concentration to specify operating conditions of the fuel cell stack. Such operating conditions include (but are not limited to) the fuel exhaust purge volume, the fuel exhaust purge mass flow rate, the fuel exhaust purge frequency, the purge valve opening size, the fuel exhaust recirculation volume, the recirculation pump speed, the fuel flow rate (or fuel stoichiometry), and/or air flow rate (or oxidant stoichiometry).

For instance, if the hydrogen concentration of the fuel exhaust is high, the purge volume and/or purge frequency can be decreased so that less hydrogen is purged, the fuel exhaust recirculation volume can be increased, and/or the fuel flow rate from the fuel source can be decreased. However, if the hydrogen concentration of the fuel exhaust is low, the purge volume and/or purge frequency can be increased to remove nitrogen (and other impurities), the fuel exhaust recirculation volume can be decreased, and/or the fuel flow rate can be increased. One of ordinary skill will recognize that the nitrogen (or impurity) concentration may be determined in addition to, or in place of, the hydrogen concentration, to determine the operating conditions of the fuel cell stack. In addition, one of ordinary skill will also recognize that the desired operating conditions stored in the controller may be directly correlated to the bleed down time and/or bleed down curve.

This technique also has application when impurities, such carbon monoxide and/or carbon dioxide, are present in the fuel exhaust. Such impurities have densities that are substantially greater than the density of hydrogen (more than 13 times difference) and approximately the same as nitrogen. For example, using the same calculations as above, it is calculated that for a 1 liter vessel having a 0.5 mm orifice, the bleed down time for pure nitrogen and pure carbon monoxide will be about 13 seconds, for pure carbon dioxide about 14 seconds, for a 70%/30% hydrogen/nitrogen mixture about 7 seconds, and for pure hydrogen about 3.5 seconds, for the same upper and lower bound pressures. Furthermore, such impurities often exist in very small amounts (typically much less than 10 parts per million) so the estimated hydrogen concentration should not be significantly affected by the presence of minute amounts of impurities.

Appropriate upper and lower bound pressures can be readily predetermined based on the desired bleed time and the expected hydrogen concentration range for a given mode of operation, as well as the orifice and vessel sizes. The bleed time may range from, for example, about 1 second to about 60 seconds. In some embodiments, controller 18 may determine the upper and lower bound pressures based on an operating condition of the fuel cell stack, for example, based on the operating pressures and/or load drawn from the fuel cell stack.

In some embodiments, the fuel exhaust may contain water vapor which could condense in or near orifice 34 and produce false readings. Such false readings can be avoided by placing orifice 34 at an upper portion of vessel 30. In one embodiment, vessel 30 may contain a water knockout at the bottom and/or upstream of vessel 30. Furthermore, an optional diluter, catalytic combustor, recombiner, or the like (not shown), may be incorporated into a downstream portion of purge valve 16 to consume any traces of hydrogen in the fuel exhaust and prevent hydrogen from being released into the ambient air, which is particularly useful for applications where hydrogen emission standards are stringent.

As mentioned in the foregoing, and in one embodiment, all the residual gas in the vessel may be substantially displaced prior to measuring the bleed down characteristic of the fuel exhaust. The time required to substantially displace the residual gas can be determined empirically by one of ordinary skill in the art. In some embodiments, a valve (not shown) may be installed in the vessel that opens up to ambient (or other low pressure source) when fuel exhaust gas is directed into the vessel to more quickly displace the residual gas. Such a valve may be installed in a bottom portion of the vessel, which would also help remove any condensed water in the vessel.

Figure 3:
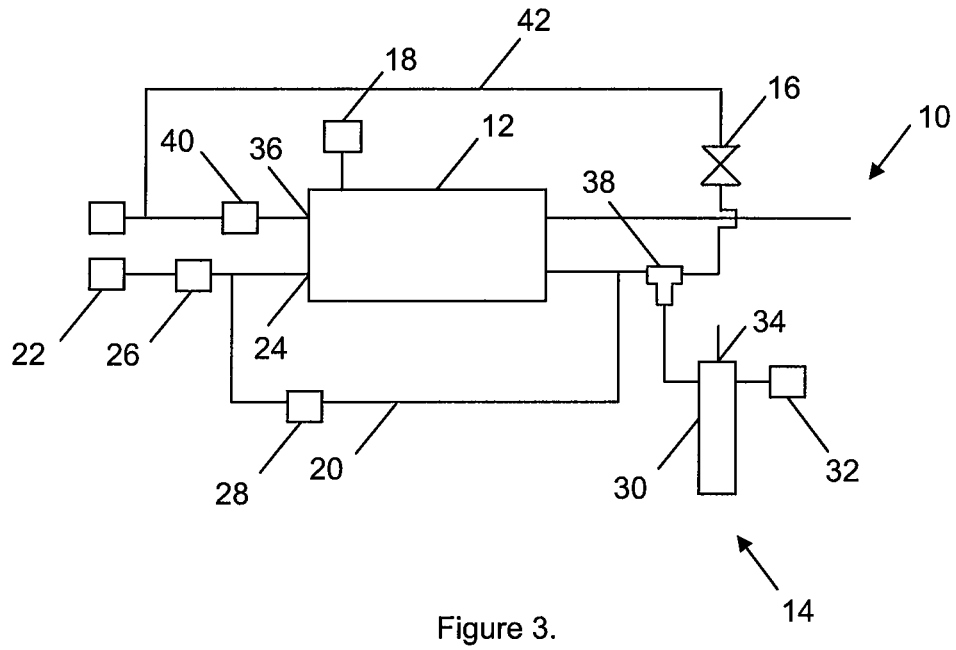
FIG. 3 shows a representative fuel cell system according to an alternative embodiment.

In another embodiment, as depicted in FIG. 3, at least a portion of the fuel exhaust is purged from purge valve 16 to oxidant inlet 36 upstream of air compressor 40 via line 42. This allows any excess hydrogen that has been purged from anode recirculation loop 20 to be consumed in the cathode of fuel cell stack 12. In addition, hydrogen sampling device 14 can provide real time monitoring of the hydrogen concentration of the fuel exhaust being purged into the cathode of the fuel cell stack, thereby allowing the controller to adjust the air flow (or oxidant stoichiometry) to the cathode so that the hydrogen concentration in the cathode is outside of the explosive limit. Additionally, or alternatively, the fuel exhaust from hydrogen sampling device 14 may be purged to the cathode vent (not shown), so that excess hydrogen in the fuel exhaust can be consumed by or diluted in the oxidant exhaust.

Figure 4:
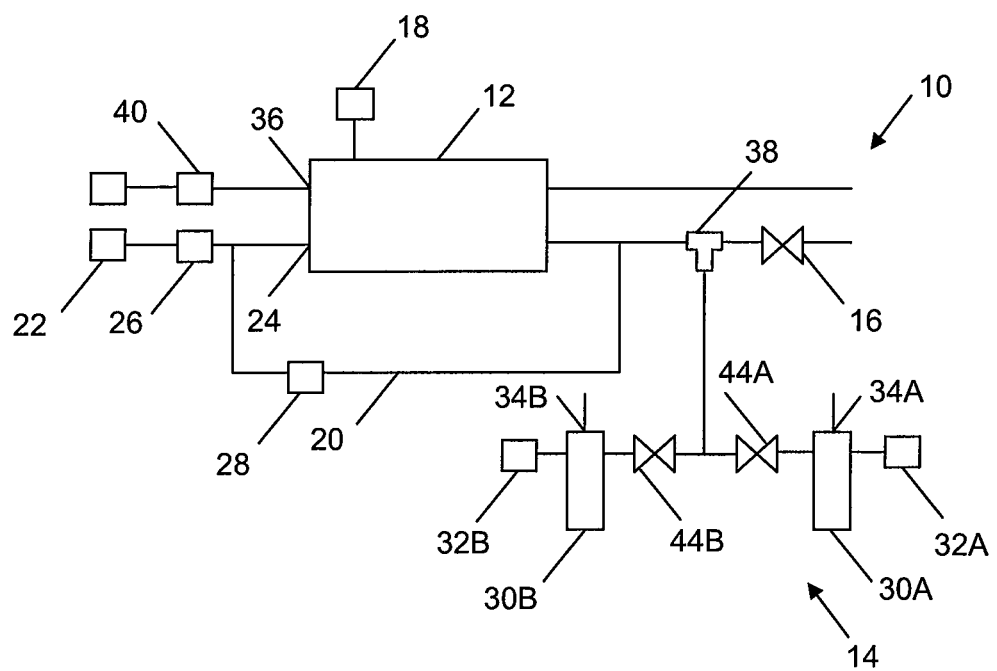
FIG. 4 shows a representative fuel cell system according to a further alternative embodiment.

In still a further embodiment, as depicted in FIG. 4, a plurality of sampling devices 30A and 30B may be used in fuel cell system 10. At low power generation conditions, the fuel cell stack will require less fuel and oxidant, which results in a longer vessel fill time if using a single, large vessel. By using two (or more) smaller vessels, one of the vessels, such as vessel 30B, can be isolated by closing valve 44B during low power generation conditions, thereby reducing the time required to fill up vessel 30A and improving accuracy of the measurement. One of ordinary skill in the art will appreciate that other hydrogen sampling device configurations having a plurality of vessels may be employed.

In any of the above embodiments, the desired operating conditions of the purge valve and/or fuel recirculation device for different hydrogen concentrations of the fuel exhaust may be stored in controller 18 by means of a mathematical model or lookup table. Furthermore, temperature and humidity sensors may be incorporated into fuel cell system 10 to detect the temperature and humidity of the fuel exhaust. For example, temperature and humidity sensors (not shown) may be located in vessel 30 or in the fuel exhaust line upstream of vessel 30. Such temperature and humidity sensors are useful because the temperature and humidity of the gases entering the vessel may have an effect on the bleed down time and the estimated hydrogen concentration measurement. To correct for temperature and/or humidity effects, correction factors can be stored in the controller in the form of a mathematical model or lookup table.

Furthermore, in any of the above embodiments, purge valve 16 may be any suitable valve. In one example, purge valve 16 is a PWM or proportional valve, which can act as a variable orifice that can be set to the required purge flows and can be shut off when a measurement of the bleed down time is desired. Further, although orifice 34 is described above as being connected to atmospheric pressure, one of ordinary skill will appreciate that orifice 34 can be connected to an environment having a pressure above atmospheric pressure, so long as that pressure is below the upper and lower bound pressure, and is relatively constant during the measurement.

From the foregoing, it will be appreciated that, although specific embodiments have been described herein for the purpose of illustration, various modifications may be made without departing from the spirit and scope of the invention. Accordingly, the invention is not limited except by the appended claims.

What is claimed is:

1. A method of operating a fuel cell system, the fuel cell system comprising a fuel cell stack having a fuel exhaust stream and a vessel downstream of the fuel cell stack fluidly connected to the fuel exhaust stream, the method comprising:
   displacing substantially all residual gas in the vessel by providing at least a portion of the fuel exhaust stream to the vessel;
   isolating the vessel from the fuel cell stack after the fuel exhaust stream displaces substantially all residual gas in the vessel;
   determining, while the vessel is isolated from the fuel cell stack, at least one bleed down characteristic as the fuel exhaust within the vessel is released through an orifice; and
   setting an operating condition of the fuel cell stack based on the at least one bleed down characteristic.

2. The method of claim 1, wherein the orifice is fluidly connected to ambient.

3. The method of claim 1, wherein the at least one bleed down characteristic is at least one of a bleed down time and a bleed down curve of the fuel exhaust within the vessel.

4. The method of claim 3, wherein the vessel further comprises a pressure measurement means and the bleed down time is a time for the pressure in the vessel to drop from a predetermined upper bound pressure to a predetermined lower bound pressure.

5. The method of claim 1, wherein the operating condition of the fuel cell stack is selected from the group consisting of a fuel exhaust purge volume, a fuel exhaust purge mass flow rate, a fuel exhaust purge frequency, and a purge valve opening size.

6. The method of claim 1, wherein the operating condition of the fuel cell stack is selected from the group consisting of a fuel exhaust recirculation volume, a recirculation flow rate, a recirculation pump speed, a fuel stoichiometry, and an oxidant stoichiometry.

7. The method of claim 1, further comprising determining a hydrogen concentration based on the at least one bleed down characteristic.

8. The method of claim 1, further comprising:
   providing a fuel and an oxidant to the fuel cell stack; and
   drawing a load from the fuel cell stack.

9. The method of claim 1, further comprising:
   providing at least a portion of the fuel exhaust stream from the fuel cell stack to the vessel, the vessel comprising a pressure measurement means and the orifice;
   measuring a fuel exhaust pressure in the vessel by the pressure measurement means; and
   determining a hydrogen concentration in the fuel exhaust based on the at least one bleed down characteristic.

10. A method of operating a fuel cell system, the fuel cell system comprising a fuel cell stack having a fuel exhaust stream and a vessel downstream of the fuel cell stack fluidly connected to the fuel exhaust stream, the method comprising:
    displacing substantially all residual gas in the vessel by providing at least a portion of the fuel exhaust stream to the vessel;
    isolating the vessel from the fuel cell stack after the fuel exhaust stream displaces substantially all residual gas in the vessel, wherein the vessel is isolated by a valve arranged in a fuel exhaust line, and the valve and vessel are separate components;
    determining at least one bleed down characteristic as the fuel exhaust within the vessel is released through an orifice; and
    setting an operating condition of the fuel cell stack based on the at least one bleed down characteristic.

11. The method of claim 10, wherein the valve is a three-way valve that is adjustable to pass the fuel exhaust stream to the vessel and to pass the fuel exhaust stream to a downstream purge valve without the fuel exhaust stream passing through the vessel.

12. The method of claim 10, wherein the at least one bleed down characteristic is at least one of a bleed down time and a bleed down curve of the fuel exhaust within the vessel.

13. The method of claim 12, wherein the vessel further comprises a pressure measurement means and the bleed down time is a time for the pressure in the vessel to drop from a predetermined upper bound pressure to a predetermined lower bound pressure.

14. The method of claim 10, wherein the operating condition of the fuel cell stack is selected from the group consisting of a fuel exhaust purge volume, a fuel exhaust purge mass flow rate, a fuel exhaust purge frequency, and a purge valve opening size.

15. The method of claim 10, wherein the operating condition of the fuel cell stack is selected from the group consisting of a fuel exhaust recirculation volume, a recirculation flow rate, a recirculation pump speed, a fuel stoichiometry, and an oxidant stoichiometry.

16. The method of claim 10, further comprising:
    providing at least a portion of the fuel exhaust stream from the fuel cell stack to the vessel, the vessel comprising a pressure measurement means and the orifice;
    measuring a fuel exhaust pressure in the vessel by the pressure measurement means; and
    determining a hydrogen concentration in the fuel exhaust based on the at least one bleed down characteristic.

* * * * *